(12) United States Patent
Kawai et al.

(10) Patent No.: US 7,136,917 B2
(45) Date of Patent: Nov. 14, 2006

(54) COMMUNICATION SYSTEM AND METHOD HAVING COMMUNICATION DATA DIVIDING AND TRANSMITTING FUNCTIONS

(75) Inventors: Shigeki Kawai, Yokohama (JP); Manabu Sawada, Yokohama (JP)

(73) Assignee: Denso Corporation, Kariya (JP)

(*) Notice: Subject to any disclaimer, the term of this patent is extended or adjusted under 35 U.S.C. 154(b) by 780 days.

(21) Appl. No.: 10/100,052

(22) Filed: Mar. 19, 2002

(65) Prior Publication Data
US 2002/0152217 A1 Oct. 17, 2002

(30) Foreign Application Priority Data
Apr. 13, 2001 (JP) ............................. 2001-115942

(51) Int. Cl.
*G06F 15/16* (2006.01)
(52) U.S. Cl. .................................. 709/223; 455/456.1
(58) Field of Classification Search .................. 707/10, 707/2, 3, 6; 709/217–219, 200–203, 223–227; 455/441, 436, 456.1, 456.2, 456.3, 456.5, 455/456.6, 63.2
See application file for complete search history.

(56) References Cited

U.S. PATENT DOCUMENTS

| | | | |
|---|---|---|---|
| 5,754,961 A | | 5/1998 | Serizawa et al. ............ 455/517 |
| 5,758,151 A | * | 5/1998 | Milligan et al. ............. 707/100 |
| 5,864,578 A | * | 1/1999 | Yuen ........................... 375/143 |
| 5,987,506 A | * | 11/1999 | Carter et al. ................. 709/213 |
| 6,049,721 A | | 4/2000 | Serizawa et al. ............ 455/509 |
| 6,236,365 B1 | * | 5/2001 | LeBlanc et al. ............. 342/457 |
| 6,278,939 B1 | * | 8/2001 | Robare et al. ............... 701/208 |
| 6,301,463 B1 | * | 10/2001 | Dao et al. ..................... 455/39 |
| 6,370,377 B1 | * | 4/2002 | Take et al. ................. 455/432.1 |
| 6,463,433 B1 | * | 10/2002 | Baclawski ...................... 707/5 |

FOREIGN PATENT DOCUMENTS

| | | |
|---|---|---|
| JP | A-10-145363 | 5/1998 |
| JP | 10-046338 * | 8/1999 |
| JP | A-11-234724 | 8/1999 |
| JP | A-2001-268625 | 9/2001 |

OTHER PUBLICATIONS

Haas, Z.; Chih-Lin I; "On handoffs in packetized wireless systems" Vehicular Technology Conference, 1993 IEEE 43rd May 18-20 1993 pp. 917-921.*

N. Imai, H. Morikawa, and T. Aoyama. "Data Transfer with Prefetching on Hot-Spotted Network," In Proceedings of The 3rd International Symposium on Wireless Personal Multimedia Communications (WPMC'00), Bangkok, Thailand, pp. 1050-1055, Nov. 2000.*

Author Unknown, "Topology". Published Feb. 26, 2001. Access from: http://fcit.usf.edu/network/chap5/chap5.htm.*

(Continued)

*Primary Examiner*—Moustafa M. Meky
(74) *Attorney, Agent, or Firm*—Posz Law Group, PLC

(57) ABSTRACT

In a communication system, a content server reads required data from a content database and transmits the data by packet communications over public communication lines, and a network management server receives and stores the required information from the public communication lines. The network management server sends the temporarily stored data to plural transmitter stations. Each transmitter station has a corresponding dividing device. Each dividing device receives and relays to the linked transmitter station only the amount of data required for transmission to the linked transmitter station. The remaining data is simply passed by the dividing device to the next dividing device without processing the data in any way.

7 Claims, 10 Drawing Sheets

OTHER PUBLICATIONS

Seshan, S., Balakrishnan H., and Katz, R. H. 1997. Handoffs in Cellular Wireless Networks: The Daedalus Implementation and Experience. Wirel. Pers. Commun. 4, 2 (Mar. 1997), 141-162.*

A. L. Iacono and C. Rose. Minimizing file delivery delay in an infostations system. Technical Report TR-167, WINLAB, Rutgers University, Aug. 1998.*

U.S. Appl. No. 09/804,475, filed Mar. 13, 2001, Aoki et al.

* cited by examiner

US 7,136,917 B2

COMMUNICATION SYSTEM AND METHOD HAVING COMMUNICATION DATA DIVIDING AND TRANSMITTING FUNCTIONS

CROSS REFERENCE TO RELATED APPLICATION

This application is based on and incorporates herein by reference Japanese Patent Application No. 2001-115942 filed Apr. 13, 2001.

FIELD OF THE INVENTION

The present invention relates to a communication system and method, which are suitable, for example, for transmitting data from multiple transmitter stations disposed along a road to vehicles.

BACKGROUND OF THE INVENTION

Communication systems having multiple transmitter stations disposed alongside a road for transmitting data to passing vehicles have been proposed in JP-A-2001-268625 (U.S. application Ser. No. 09/804,475 filed on Mar. 13, 2001) now U.S. Pat. No. 6,909,893. Improvements in communication protocols have also made it possible to transmit large amounts of data in a short time. This has made it feasible to transmit video signals and other types of information containing large amounts of data from the roadside transmitter stations to passing vehicles.

Despite improvements in data communication protocols, data transmission needs exceed the transmission capacity of the protocol. In order to transmit large amounts of data to vehicles travelling at high speeds, it is therefore necessary to install multiple transmitter stations alongside the road so that the vehicles receive all of the transmitted data by collecting small blocks of the data from plural transmitter stations.

One proposed system for transmitting data in segments from plural transmitter stations is shown in FIG. 12A. A network management server 200 first saves the data to be distributed to the plural transmitter stations in a memory, and then sends the data via a communication line to a switch 201. This communication line could be a wired or wireless path. Data traffic flow along this communication line is controlled by the network management server 200 segmenting or dividing the transmission data into packets for transmission to each transmitter station, and addresses each packet to a particular transmitter station 202. As shown in FIG. 12B, each packet includes a header (H1 to H4) and data (D1 to D4). The header indicates address to be directed. The switch 201 then reads the address information in each packet to distribute each data packet to the proper transmitter station 202.

This network server 200 executes processing shown in FIG. 13. The first task after server operation starts is to receive and store data required for transmission a memory of the network management server 200 (step 211). It then determines the size of the packets, that is, how much data to send to each of the plural transmitter stations 202 (step 212). The packet address identifying the transmitter station to which the packet will be sent is also determined when determining the packet size at step 212. The required packet size is determined according to the transmission capacity of the transmitter station 202 and the importance of the data.

A data block of the size determined for transmission to one transmitter station 202 is then extracted (step 213). If the packet is to be sent to transmitter station TR1, for example, the address of transmitter station TR1 is added to the packet as the header H1 (step 214). The data D1 is then sent as a transmission packet to the switch 201 (step 215). Step 216 then detects if there is any remaining data to be sent. If there is (YES), steps 213 to 215 repeat to generate and send the next data packet to the next transmitter station, such as transmitter station TR2. When step 216 determines that all of the data has been distributed to the transmitter stations, operation ends.

Packets containing address information are thus input from the network management server 200 to the switch 201, and processed by the switch 201. The switch 201 receives the packet, reads the address from the input packet header, and send the data to the addressed transmitter station 202. More specifically, as shown in FIG. 14, when the switch 201 operation starts, it receives a packet and stores the received packet to a local memory (step 221). The switch 201 then reads and interprets the address of the transmitter station to which the packet must be sent (step 222). The switch 201 thus determines that the received packet is to be sent to transmitter station TR1 in this example (step 223), and then sends the packet to the addressed transmitter station (step 224). If there are four transmitter stations TR1 to TR4, for example, this operation repeats for each of the four transmitter stations 202 to send data to all of the transmitter stations 202, and operation then ends.

The network management server 200, switch 201 and transmitter stations 202 operates as shown in FIG. 15. The network management server 200 and switch 201 distribute the data received from a central higher-order server 204 to the transmitter stations 202, and the transmitter stations 202 simply retransmit the received data. More specifically, the network management server 200 must store data received via a communication network, allocate the data to particular transmitter stations, and generate and address transmission packets. The switch 201 must then read all of the received data and distribute the data to each of the addressed transmitter stations 202.

The burden of allocating data is thus concentrated on the management server 200 and switch 201. Operation of the network management server 200 and switch 201 thus becomes a bottleneck making it difficult to transmit large amounts of information at high speeds using transmitter stations 202 installed along an expressway or other road where the vehicles travel at high speed, particularly when there are many lanes and when large amounts of data such as video images are distributed.

SUMMARY OF THE INVENTION

The present invention has an object to reduce the burden involved with data distribution in a communication system used for distributing large amounts of data.

In a communication system according to the present invention, a higher-order content server that sends data to a network management server packetizes transmission data and adds a packet code to each transmitted data packet. The network management server simply stores and transmits the received data to dividing devices. Each dividing device then simply extracts the amount of data to be sent to transmitter stations managed by the particular dividing device, and does nothing to the data to be transmitted from a transmitter station managed by another dividing device. That is, each dividing device simply sends a predetermined amount of data to a transmitter station, and relays the remaining data to another dividing device.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

A preferred embodiment of the present invention is described below with reference to the accompanying drawings.

Figure 1:
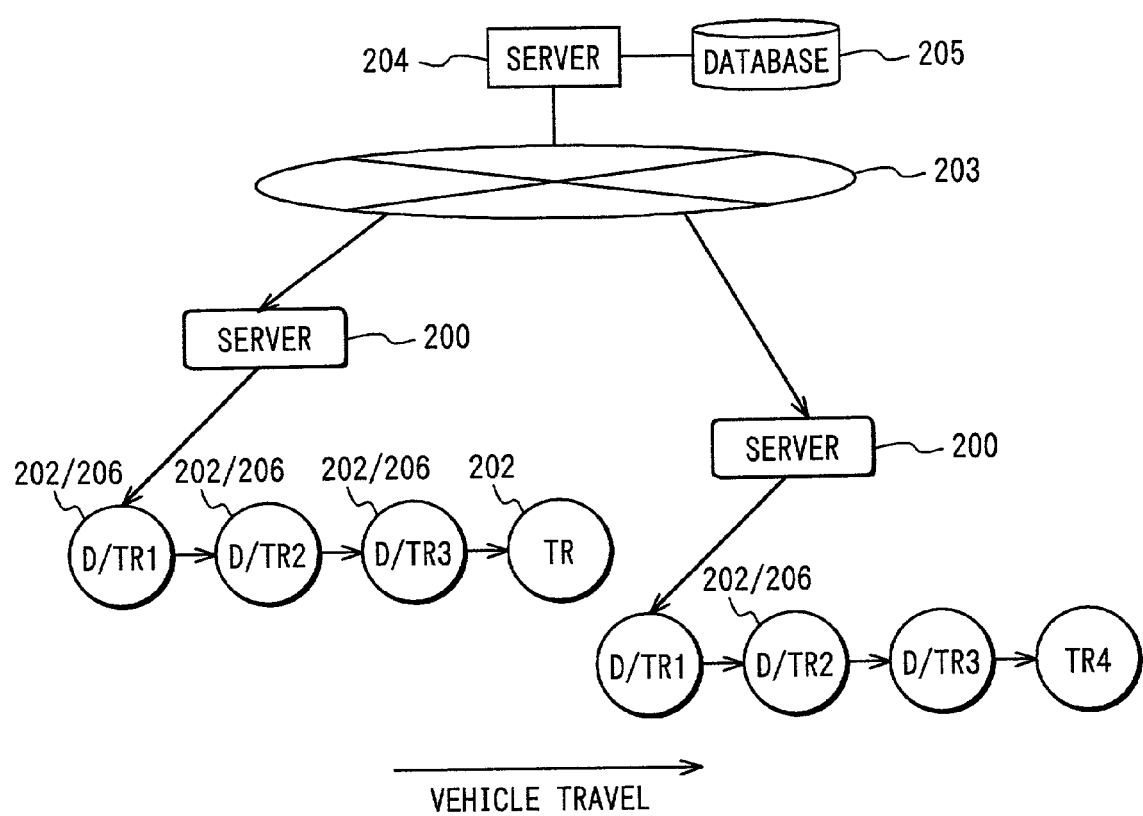
FIG. 1 is a schematic illustration showing a communication system according to the present invention.

A communication system according to the present invention has, as shown in FIG. 1, network management servers 200 located alongside a road for motor vehicles. Data from the network management servers 200 is sent to plural dividing devices and transmitter stations, thus forming a network. Each transmitter station 202 has a limited transmission range of approximately 20 meters to 30 meters. The plural transmitter stations 202 are therefore arranged in series with the distance therebetween greater than the transmission range so that the transmitter stations 202 do not interfere with each other. The transmitter stations 202 are spaced 100 meters apart from each other. In practice, there are four to ten transmitter stations 202 arranged along the road. Networks comprising four to ten transmitter stations 202 and the network management server 200 are appropriately located alongside the road.

Each network management server 200 is connected to a communication network 203, and is connected through the communication network 203 to a higher level content server 204. The content server 204 reads data from a content database 205 storing required data, and sends the data via the communication network 203 to the network management servers 200.

The higher level content server 204 determines type of data that is to be read from the content database 205 in response to a request sent from the network management server 200 via the communication network 203 based on a request from a vehicle (not shown in the figure). The content server 204 segments the data read from the content database 205 into packets, adds a code to each packet and sends the coded packets over the communication network 203. Based on the packet codes received via the communication network 203, each network management server 200 extracts and stores the necessary data.

Figure 2A:
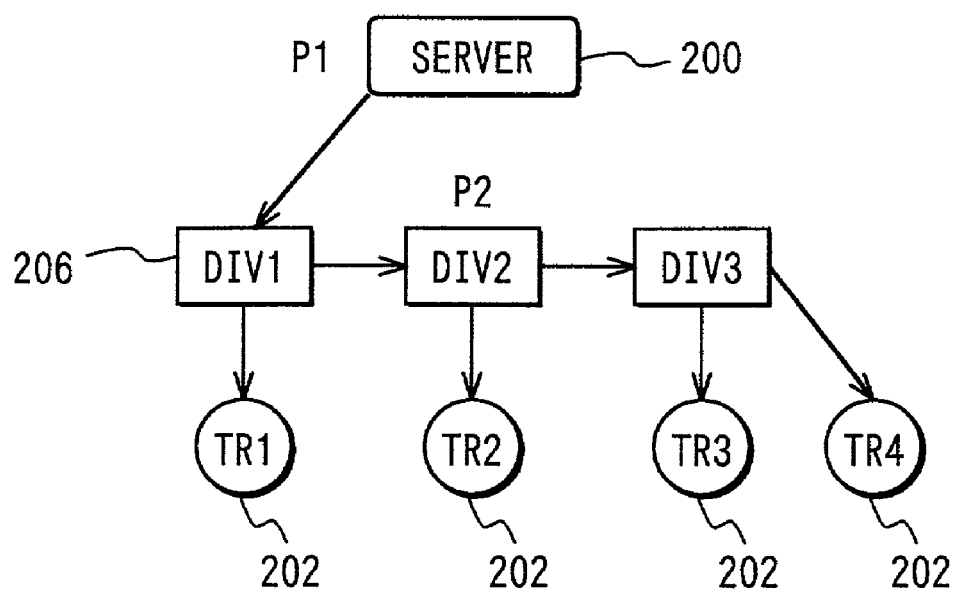
FIG. 2A is a schematic illustration showing interconnections between a network management server, dividing devices, and transmitter stations in the communication system shown in FIG. 1.
Figure 2B:
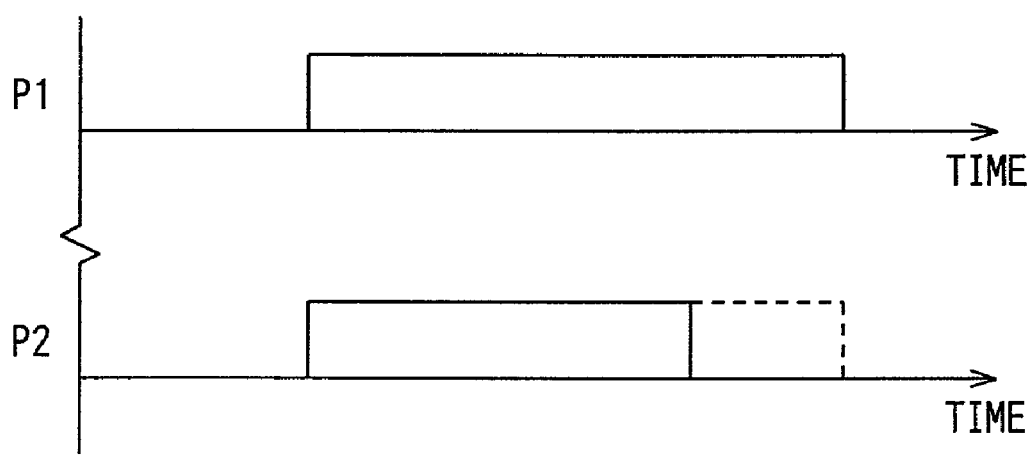
FIG. 2B is a schematic illustration showing two data transmitted through two points in FIG. 2A.

FIG. 2A shows the network linking each network management server 200 to the transmitter stations 202. A data dividing device 206 is located between the network management server 200 and each transmitter station 202. Data is transmitted between the network management server 200 and dividing devices 206, between the dividing devices 206, and between each dividing device 206 and linked transmitter station 202 via either a wired or wireless connection. The network management server 200 temporarily stores the data sent from the higher level server (content server) 204 via the communication network 203 to a memory, and then sends the data to the dividing devices 206. The data at points P1 and P2 are shown in FIG. 2B. It is noted that the data at point P2 is less than that at point P1, because a part of data (dotted line) transmitted through point P1 is transmitted from the first transmitter station 202 (TR1) and is not sent to the second dividing device 206.

Figure 3:
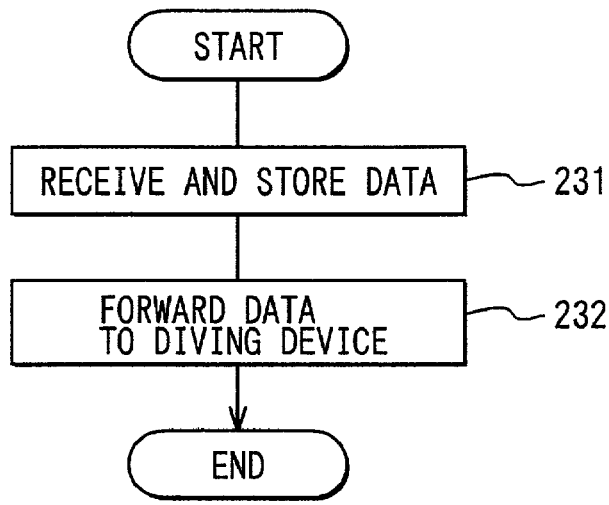
FIG. 3 is a flow chart showing operation of the network management server shown in FIG. 2A.

The network management server 200 executes processing shown in FIG. 3. Once the network management server 200 starts its operation, the necessary amount of data received from the higher level server 204 is stored in the memory (step 231), and then forwarded to the dividing device 206 (step 232). The dividing device 206 receives the data which needs to be sent to the particular transmitter station 202 managed by it.

Figure 4:
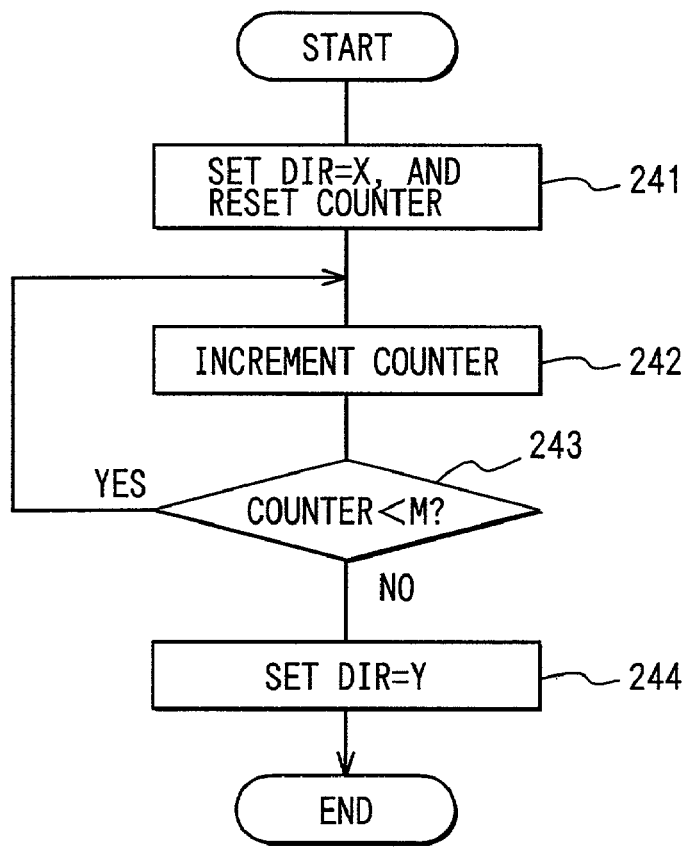
FIG. 4 is a flow chart showing control of the dividing devices shown in FIG. 2A.

The dividing device 206 executes processing shown in FIG. 4. When the dividing device 206 starts its operation, it first sets a flag DIR=X, and resets a counter used to track how much data to send from the previous operation (step 241). The flag DIR=X means that the data is to be sent to its linked transmitter station 202. The dividing device 206 then increments the counter at step 242 while reading the data. The dividing device 206 compares the counter with the specific data amount M (step 243), and repeats steps 242 and 243 along with the device operation until the counter equals M. This amount M means the amount of data that can be transmitted in a packet. The dividing device 206 thus determines that there is a sufficient amount of data to send to the linked transmitter station 202 (step 244). The dividing device 206 then sets a flag DIR=Y, which means that the data should not be sent to the linked transmitter station 202 but should be sent to the next dividing device 206. The operation of incrementing the counter at step 242 is equivalent to counting the number of data bits. The counter calculates the predetermined amount of data to be sent to the transmitter station 202.

The amount of data that can be transmitted from a single transmitter station 202 is determined by the limited transmission range of the transmitter station 202, the speed at which the vehicles passing the transmitter station 202 are travelling, and the increase in the number of vehicles passing the transmitter station 202 when there are multiple lanes within the transmission range. The transmission data is therefore segmented and distributed among multiple transmitter stations 202. The amount and content of data distributed to each transmitter station 202 can be appropriately determined by the importance of the information and the reception condition of the dividing devices 206 and vehicles.

Figure 5:
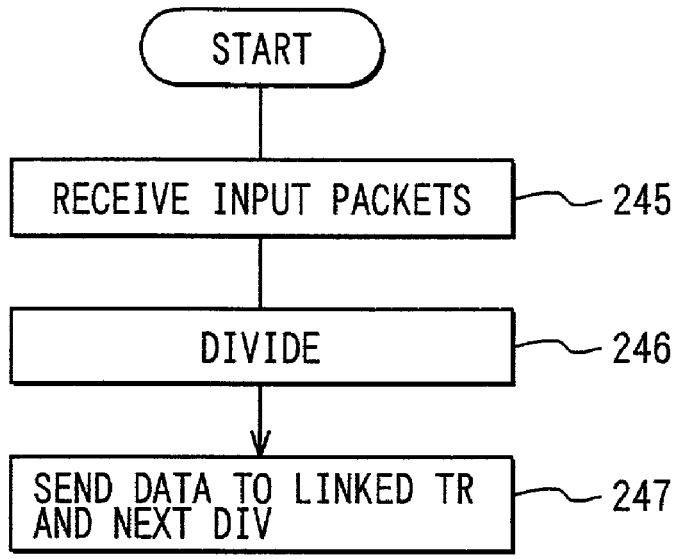
FIG. 5 is a flow chart showing operation of the dividing devices shown in FIG. 2A.

FIG. 5 schematically illustrates the dividing device operation. The dividing device 206 receives the input packets at step 245, and divides and takes out a part of data corresponding to the time or data amount specified by the network management server 200 from the received packets. At step 247, it sends this packet data to the linked transmitter station 202 (TR) and simply passes the remaining data to the next dividing device 206 (DIV) without processing it in any way.

Figure 6:
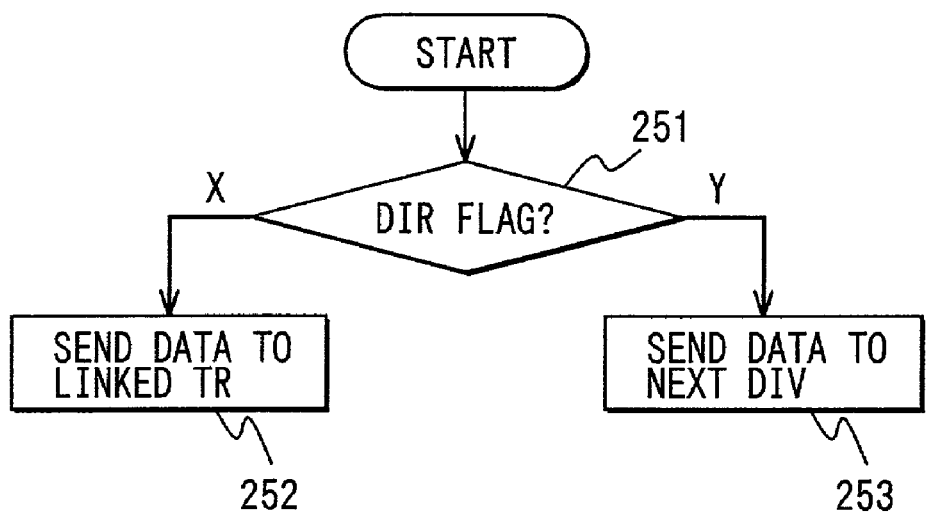
FIG. 6 is a flow chart showing control of the switching part of the dividing devices shown in FIG. 2A.

The dividing device 206 executes processing shown in FIG. 6 to reconfigure the data for transmission to the transmitter station 202 and next dividing device 206. This processing follows the processing shown in FIG. 4. At step 251, the dividing device 206 detects if the flag for sending data to its corresponding or linked transmitter station 202 is out (DIR=X). If the flag is out, indicating that the data is to be sent to the linked transmitter station 202, the dividing device 206 sends the required data at step 252. If the data is determined not be sent to the linked transmitter station 202 at step 251, the dividing device 206 simply sends the data to the next dividing device 206 at step 253. The flag identifying whether data is to be sent to the linked transmitter station 202 is detected using the counter (step 243) shown in FIG. 4. However, the required data amount can be determined not only by counting bits but also by determining a certain time limit based on the transmitted data, and determining the data amount using a clock.

Figure 7:
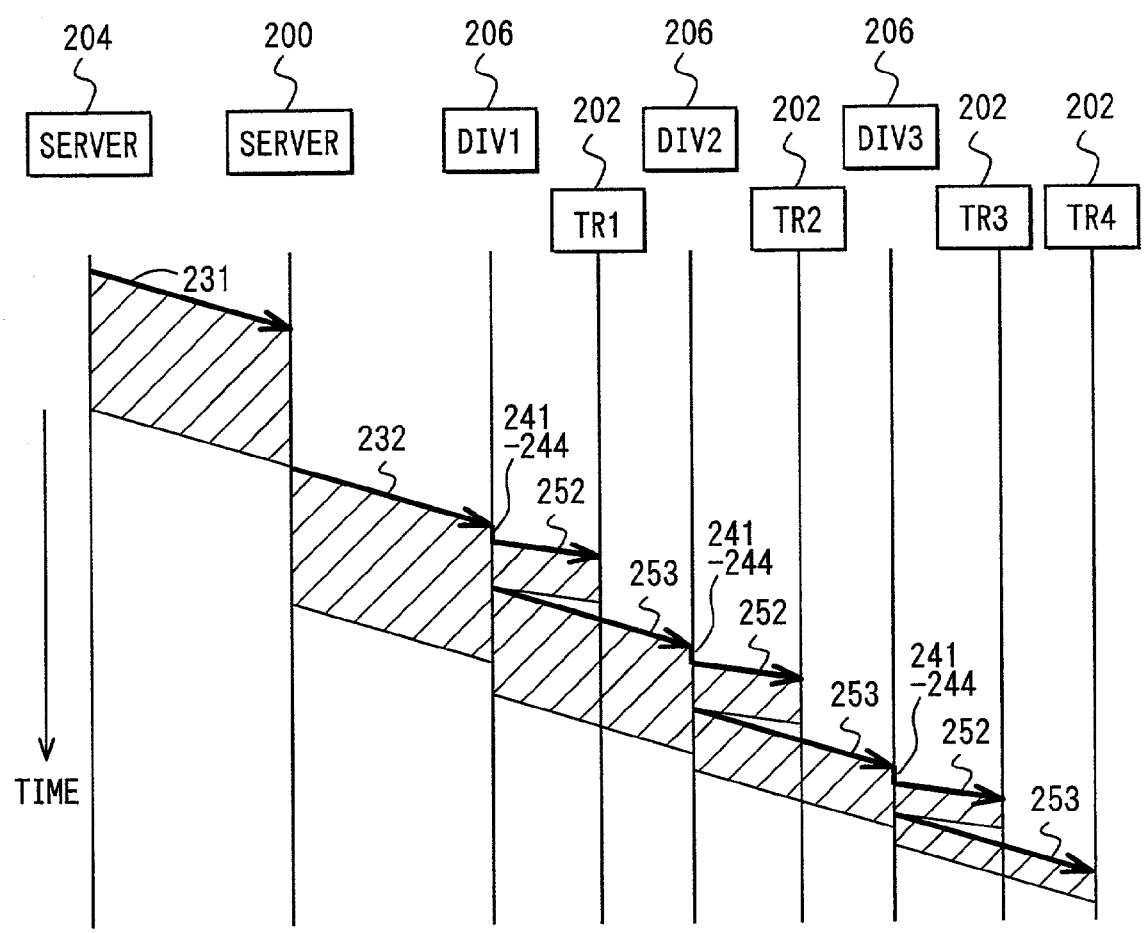
FIG. 7 is a time chart showing operating sequence of the communication system shown in FIG. 2A.

FIG. 7 shows the operation of the network management server 200, dividing devices 206, and transmitter stations 202 with the passage of time. In this embodiment, each dividing device 206 operates only for as long as required to capture the data to be transmitted to the linked transmitter station 202 from the data stored by the network management server 200. More specifically, the first dividing device 206 (DIV1) only captures the data to be transmitted to the first transmitter station 202 (TR1), the second dividing device 206 (DIV2) only captures the data to be transmitted to the second transmitter station 202 (TR2), and so forth. It is therefore possible for the operations required to capture the data for transmission to the first transmitter station 202 (TR1), second transmitter station 202 (TR2), and other transmitter stations 202 to be executed in parallel by the first dividing device, second dividing device, and other dividing devices 206.

A certain time required for the management server 200 to store the required data will naturally be required, but the parallel operations of the other dividing devices 206 and transmitter stations 202 can run at the same time. It is therefore possible to delay the operating speed of the dividing devices 206 and transmitter stations 202 relative to the network management server 200, which is very practically beneficial particularly in applications transmitting large amounts of data at high speed from the transmitter stations 202 to a moving vehicle.

Figure 8:
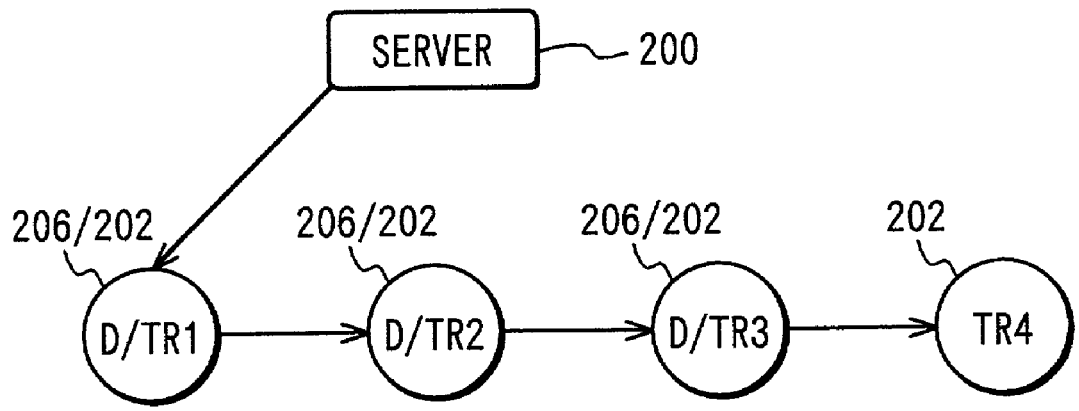
FIG. 8 is a schematic illustration showing how dividing devices are increased in the communication system according to the present invention.
Figure 9:
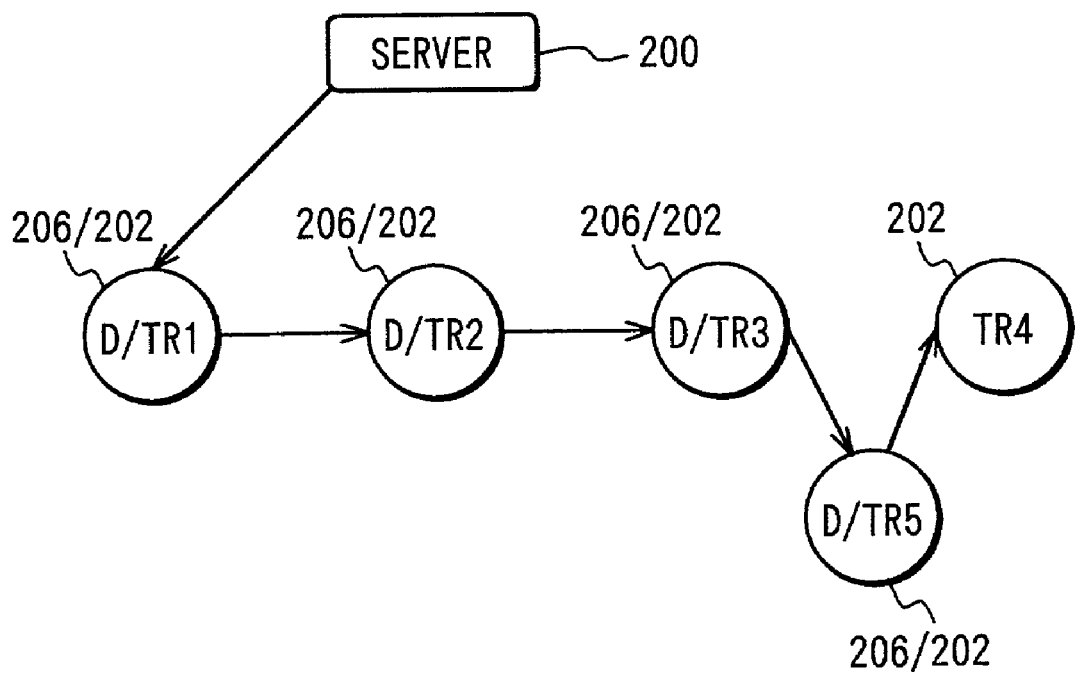
FIG. 9 is a schematic illustration showing how dividing devices are increased in the communication system according to the present invention.

The above embodiment may be modified in various ways. For example, if the network has first to fourth transmitter stations 202 (TR1–TR4) as shown in FIG. 8 and it becomes necessary to increase the data sent from the third to the fourth transmitter stations 202, it is possible to add a fifth transmitter station 202 (TR5) between the third transmitter station 202 (TR3) and fourth transmitter station 202 (TR4) as shown in FIG. 9. Thus, the third transmitter station 202 (TR3) is connected to the fifth transmitter station 202 (TR5). The fifth transmitter station 202 (TR5) then transmits the data captured by the fifth dividing device 206 (DIV5) to the vehicle, and sends the remaining data to the fourth transmitter station 202 (TR4). The network can thus be easily reconfigured by simply changing the links between devices comprising a dividing device 206 and transmitter stations 202.

Figure 12A:
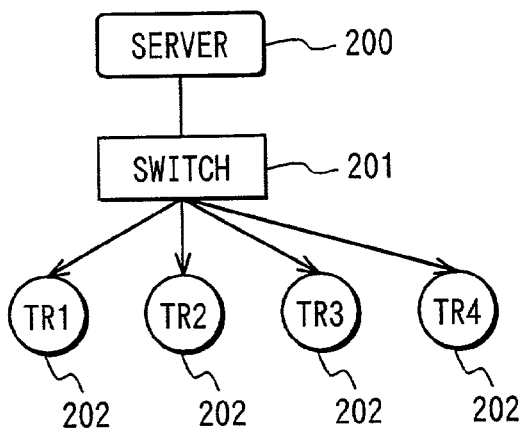
FIG. 12A is a schematic illustration showing a communication system according to a related art.
Figure 12B:
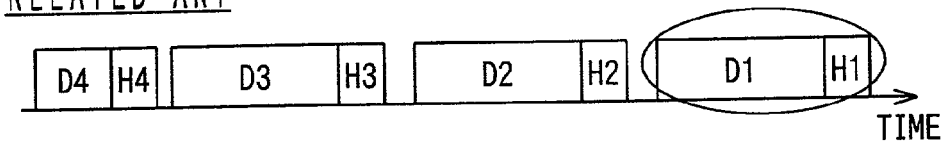
FIG. 12B is a schematic illustration showing a flow of packet data in the system shown in FIG. 12A.
Figure 13:
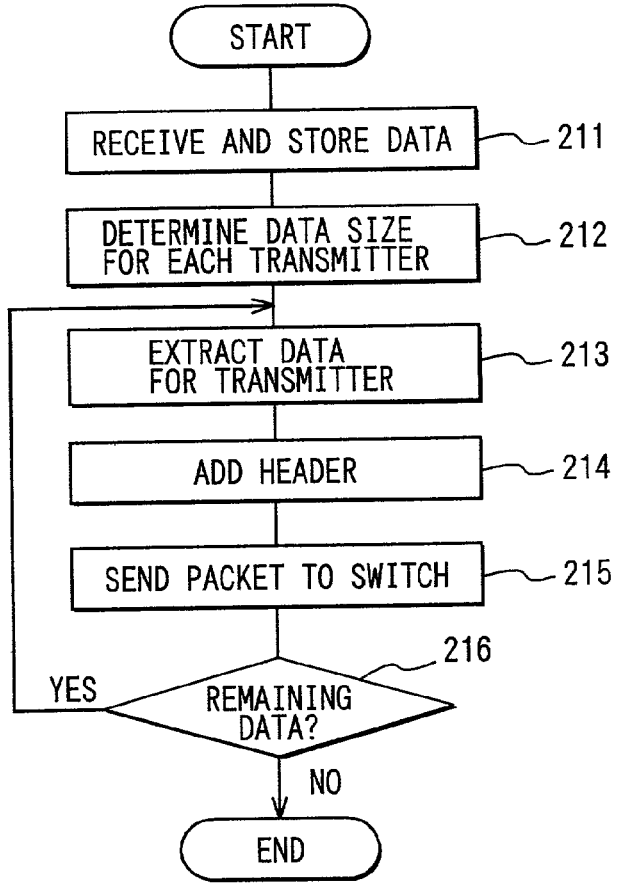
FIG. 13 is a flow chart showing operation of a server shown in FIG. 12A.
Figure 14:
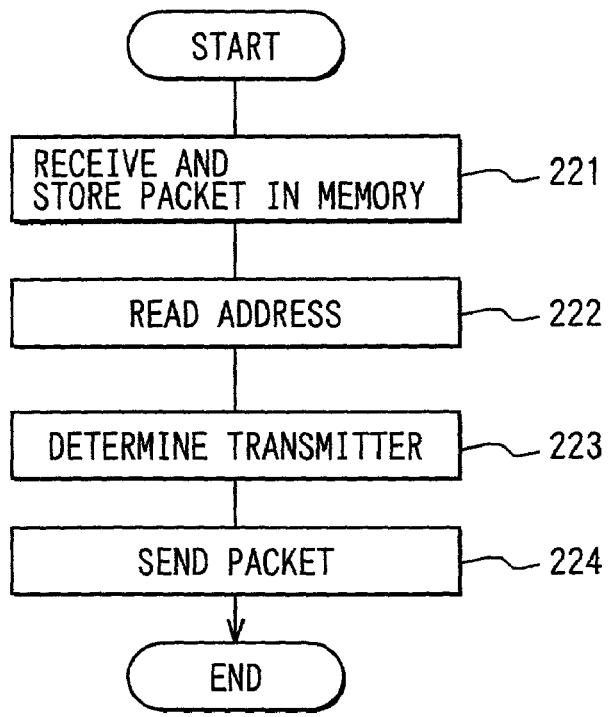
FIG. 14 is a flow chart showing operation of a switch shown in FIG. 12A.
Figure 16:
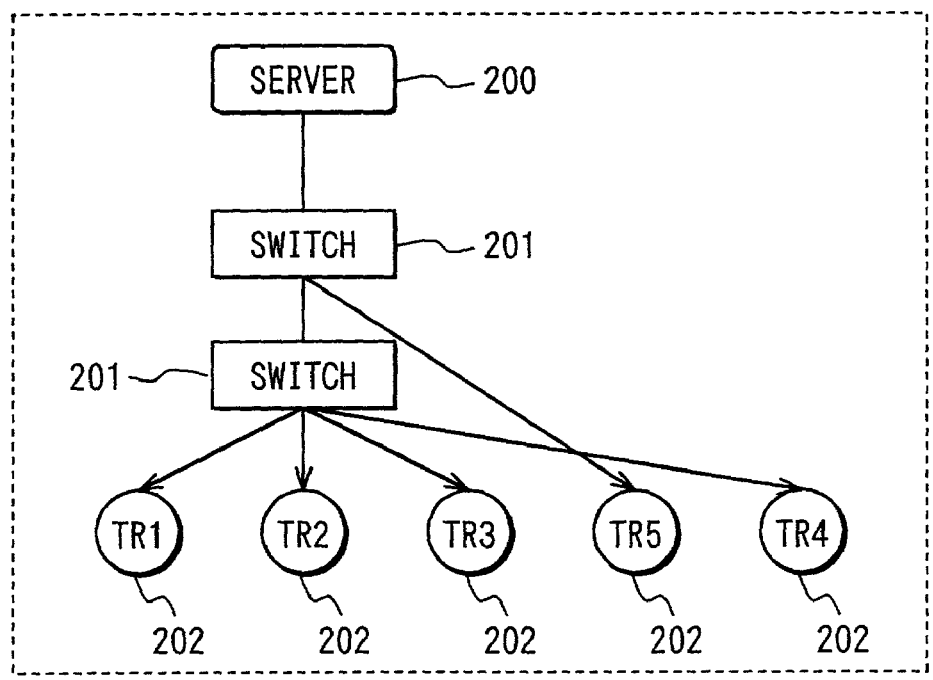
FIG. 16 is a schematic illustration showing a communication system which is a modification of the communication system shown in FIG. 12A.
Figure 15:
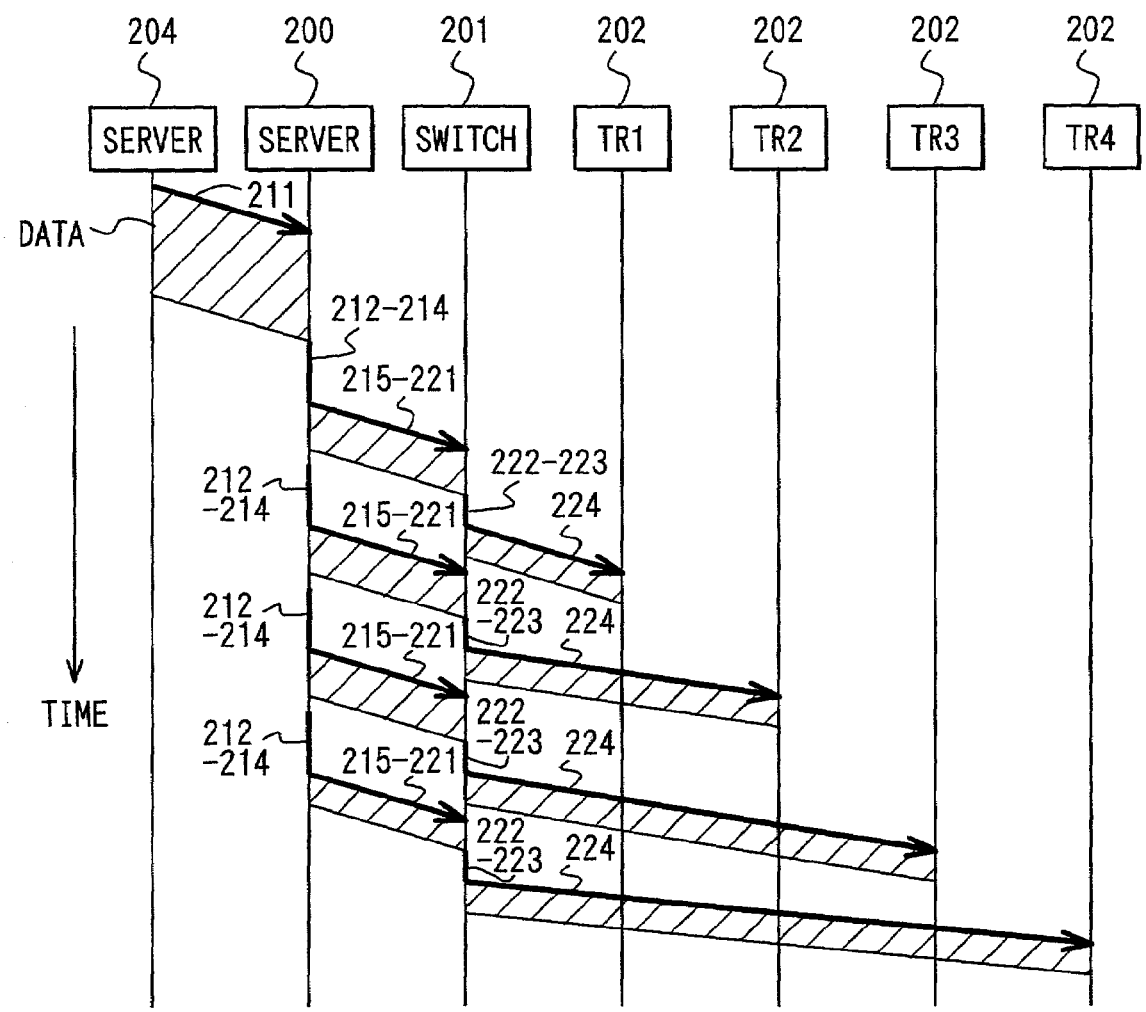
FIG. 15 is a time chart showing operation of the communication system shown in FIG. 12A.

In the proposed network configured as shown in FIG. 12, if the capacity of the switch 201 is exceeded by adding a new transmitter station 202 (TR5), it is also necessary to add another switch 201 as shown in FIG. 16. Transmission timing from the transmitter stations with the system configured as shown in FIG. 16 is therefore controlled by two switches 201, and transmission efficiency is not particularly good.

Figure 10:
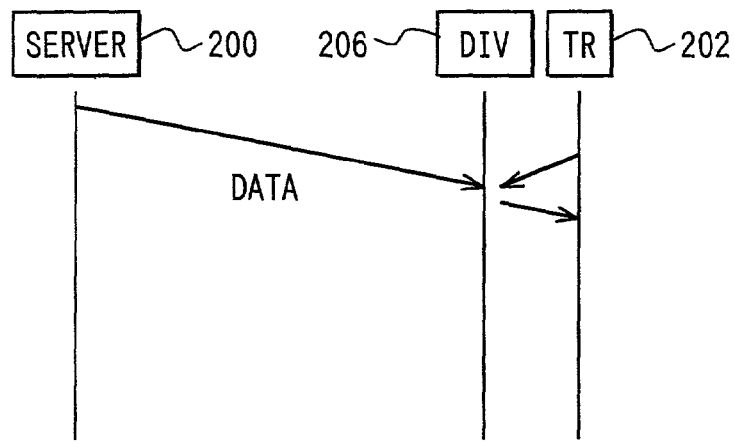
FIG. 10 is a schematic illustration showing relationship between the dividing devices and the transmitter stations in the communication system according to the present invention.

By combining the dividing device 206 and transmitter station 202 in paired sets as described above, connectors between each dividing device 206 and linked transmitter station 202 are not needed. This is illustrated in FIG. 10. If the dividing device 206 and transmitter station 202 are separate components, a data transmission delay arises from sending communication data between the dividing device 206 and transmitter station 202. If the dividing device 206 and transmitter station 202 are integrated in the same circuit board or chip, however, substantially no data transmission delay occurs between the dividing device 206 and transmitter station 202. The system of the above embodiment shown in FIGS. 1 to 9 is therefore particularly suited to transmitter stations used for relaying large amounts of data at high speed.

Figure 11A:
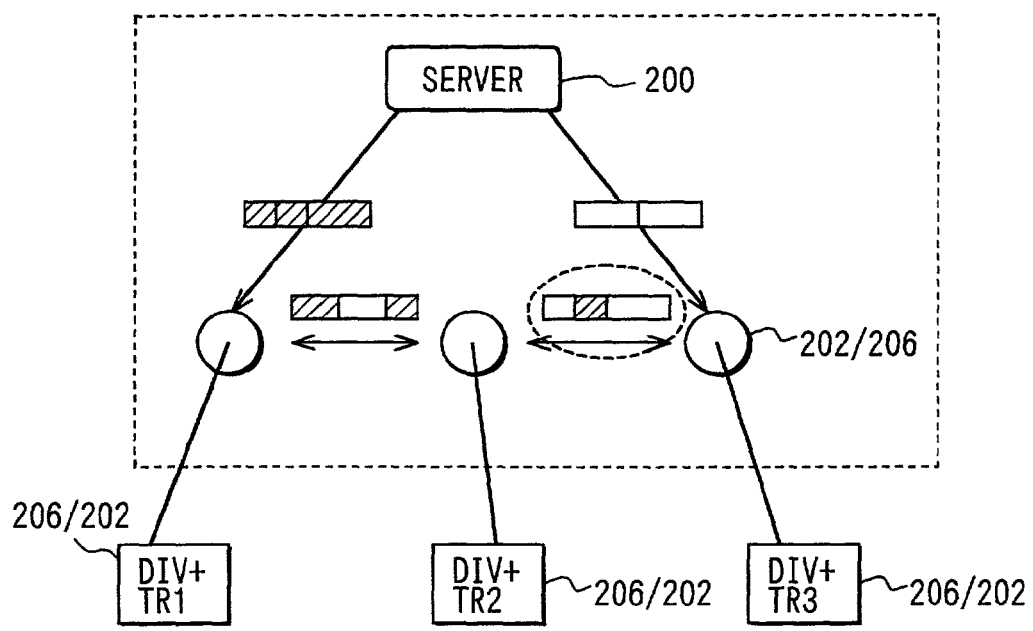
FIG. 11A is a schematic illustration showing an alternative configuration of a communication system according to the present invention.
Figure 11B:
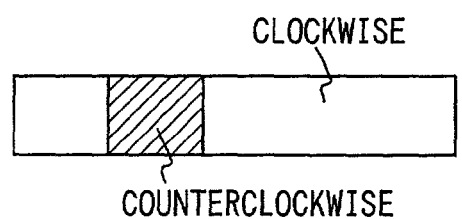
FIG. 11B is a schematic illustration showing a data pattern transmitted in the system shown in FIG. 11A.

As described above, multiple transmitter stations 202 and dividing devices 206 are connected in series in this embodiment with the most-upstream (i.e., the first) dividing device 206 and transmitter station 202 connected to the network management server 200. It is also possible, however, to construct a network loop as shown in FIG. 11A with the network management server 200 also connected to the most-downstream dividing device 206 and transmitter station 202. In this case, as shown in FIG. 11B, the data relayed from the network management server 200 can contain data travelling clockwise and data travelling counterclockwise through the network. For example, data content can be time split with clockwise-travelling data in a first time slot and counterclockwise-travelling data in a second time slot. Because data is captured and removed from the data stream by each dividing device 206 so that each dividing device 206 receives less data than the preceding dividing device 206, each of the dividing devices 206 receives substantially the same amount of data if the data is passed from both the first and last of the serially connected dividing devices 206, yet further improving data transmission efficiency.

If the data is distributed in this clockwise and counterclockwise fashion to multiple transmitter stations 202 arrayed along a road as shown in FIG. 11A, the direction of data flow could, for example, conform to the direction of vehicle travel. Of course the data transmission rate is obviously significantly faster than the speed of vehicle travel, and the direction of data flow does not need to match the direction of vehicle travel.

According to the communication system, dividing devices relay data transmitted from a network management server to a specific transmitter station and capture only that part of the total data which is required for that transmitter station, simply forwarding the remaining data to the next dividing device. Large amounts of data can therefore be efficiently distributed in a short time. When applied to a system for transmitting data in a narrowly limited range alongside a road, the communication system of the invention can therefore efficiently transmit data to vehicles travelling at high speed.

What is claimed is:

1. A communication system comprising:
   a content database for storing content data therein;
   a content server for reading a part of the content data as read data from the content database in response to a request from a mobile body and transmitting the read data in packets over a public network;
   a network management server for temporarily storing in a memory and managing a distribution of the read data transmitted over the public network;
   a plurality of transmitter stations for transmitting the read data to the mobile body; and
   a plurality of dividing devices arranged in series and linked with the plurality of transmitter stations, respectively, for receiving the read data from the network management server and relaying the read data from one dividing device to a next dividing device so that the read data is dividedly transmitted from the plurality of transmitter stations, the one dividing device dividing out a part of the read data for transmission from one transmitter station linked therewith and relaying a remaining part of the read data to the next dividing device.

2. A communication system as in claim 1, wherein an amount of the read data temporarily stored by the network management server is an amount of data to be captured by the dividing devices and distributed to the transmitter stations.

3. A communication system as in claim 1, wherein the network management server instructs the content server what data to read and transmit over the network.

4. A communication system as in claim 1, wherein each packet of the read data from the content server is smaller than the part of the read data divided out by the dividing devices, and the part contains plural packets.

5. A communication system as in claim 1, wherein only a first of the dividing devices is connected to the network management server.

6. A communication system as in claim 1, wherein a first and a last of the dividing devices are connected to the network management server, and the network management server and the dividing devices form a communication loop.

7. A communication system in accordance with claim 1, wherein the transmitter stations are located along a road and distanced from each other so that the mobile body receives the read data part by part from the transmitter stations while moving along the road.

* * * * *